United States Patent [19]

Mercer

[11] Patent Number: 4,590,029
[45] Date of Patent: May 20, 1986

[54] MOLECULARLY ORIENTATING PLASTICS MATERIAL

[75] Inventor: Frank B. Mercer, Blackburn, England

[73] Assignee: P. L. G. Research Limited, Blackburn, England

[21] Appl. No.: 538,420

[22] Filed: Oct. 3, 1983

[30] Foreign Application Priority Data

Oct. 13, 1982 [GB] United Kingdom ................ 8229205

[51] Int. Cl.[4] ............................................. B29C 55/12
[52] U.S. Cl. ..................................... 264/156; 264/284; 264/288.8; 264/290.2; 264/DIG. 81
[58] Field of Search .................. 264/284, 288.4, 288.8, 264/290.2, DIG. 47, DIG. 81, 41, 145, 154, 152, 155

[56] References Cited

U.S. PATENT DOCUMENTS

| | | | |
|---|---|---|---|
| 3,328,505 | 6/1967 | Spencer | 264/284 |
| 3,386,876 | 6/1968 | Wyckoff | 161/109 |
| 3,441,638 | 4/1969 | Patchell et al. | 264/154 |
| 3,616,154 | 10/1971 | Dow et al. | 264/154 |
| 3,900,550 | 9/1975 | Oliver et al. | 264/320 |
| 4,280,978 | 7/1981 | Dannheim et al. | 264/156 |
| 4,374,798 | 2/1983 | Mercer | 264/288.8 |

FOREIGN PATENT DOCUMENTS

| | | |
|---|---|---|
| 0062462 | of 1982 | European Pat. Off. . |
| 94251 | 12/1972 | Fed. Rep. of Germany . |
| 1601073 | of 1970 | France . |
| 900914 | of 1962 | United Kingdom . |
| 1075487 | of 1967 | United Kingdom . |
| 1261515 | of 1972 | United Kingdom . |
| 1506615 | of 1978 | United Kingdom . |
| 2073090 | of 1981 | United Kingdom . |

Primary Examiner—Donald Ozaja
Assistant Examiner—Mary Lynn Fertig
Attorney, Agent, or Firm—Holman & Stern

[57] ABSTRACT

An integral plastics material starting sheet has a square or rectangular pattern of holes defining strand-forming zones. The strand-forming zones are formed with depressions with the sheet at a low or ambient temperature. The sheet is then stretched to form the strand-forming into orientated strands.

22 Claims, 17 Drawing Figures

MOLECULARLY ORIENTATING PLASTICS MATERIAL

BACKGROUND OF THE INVENTION

The present invention relates to a method of stretching plastics material having a pattern of holes or mesh openings to form molecularly orientated strands from zones (called "strand-forming zones" herein) of the plastics material. In some cases, the whole of the plastics material can be stretched out to form orientated strands. The holes may not penetrate right through the plastics material or the mesh openings may contain membranes, if desired.

The method of the invention has been found to be generally applicable, for instance to stretching integrally extruded mesh structures, e.g. those produced as described in GB No. 836 555, GB No. 969 655 or GB No. 1 250 478. The invention is more particularly applicable to methods of producing integral plastics material mesh structures by stretching starting materials having a pattern of holes which can have been formed for instance by punching. Examples of such methods are described in for instance GB No. 2 031 833A, GB No. 2 034 240A, GB No. 2 035 191B, GB No. 2 059 866A, GB No. 2 073 090B, GB No. 2 096 531A, GB No. 2 108 896A, and a U.S. application by the same Applicant filed July 1, 1983 under the title "Mesh structure and laminate made therewith".

Nonetheless, the invention was made in connection with producing biaxially-stretched materials in accordance with GB No. 2 035 191B, and will mainly be described in relation to GB No. 2 035 191B, the mesh structure produced being called "biax Square Mesh" herein for convenience.

The standard way of manufacturing biax Square Mesh is to MD (machine, i.e. longitudinal, direction) stretch using nip rolls, relax 5 to 10%, TD (transverse direction) stretch on a stenter, and relax 5 to 10%. On the stenter, there will be a large number of mesh openings across the width. It was observed that the TD stretching of the mesh openings or TD strands was not regular. As most of the initial increase in width was due to only a few strands stretching, there was very rapid stretching of those strands. In extreme cases, the strands could fibrillate and/or rupture. However, apart from the uneven appearance of the final product, less extreme cases could still cause grave disadvantages; on the first (MD) stretch, a slightly different penetration into the bar or a slightly different amount of penetration across the bar could greatly change the junction formed after the second (TD) stretch; if the increased penetration caused the junction to stretch before the strands in the second stretch, a much weaker and radically different junction would be formed.

Similar differences occurred when the second stretch was MD; as the stretch length cannot be very short in practice, there is always a number of aligned strands stretching at the same time. Such differences, though not so marked, were also apparent when making uniaxially-stretched structures.

In general terms, more difficulties were experienced with polypropylene (PP) than with high density polyethylene (HDPE), but the differences were apparent with HDPE.

THE INVENTION

In the present invention, depressions are formed in at least some of the strand-forming zones without material removal when the plastics material is at a temperature below the lower limit of its melting range, prior to stretching the respective strand-forming zones.

It has been found that by forming the depressions without material removal (i.e. without abstracting material from the structure as a whole), a much more regular structure can be formed. In a measurement of the mesh pitches in the TD, after stretching TD in a stenter, a prior PP biax Square Mesh product had a mesh pitch variation (maximum to minimum) of about 45% whereas a biax Square Mesh product in accordance with the invention had a variation of about 5%. In effect, when the strand-forming zones are being stretched in a stenter, there is a controlled, repeatable progression; the orientation usually begins in the lateral zones of the web and gradually works towards the centre, this being related to the natural stress pattern imposed by a stenter; one should apply sufficient stretch to achieve reasonable uniformity. The rate of strain during transverse orientation becomes more regular from mesh to mesh. The effect of this equalising of strain rate can ensure that the tensile strength of all the meshes is nearly the same.

The reasons for this are not well understood. It is believed that by forming the depression below the melting range, some molecular yielding occurs and there is some pre-orientation of the plastics material in the strand-forming zones, in particular in the deepest part at least of the depression. Microscopic examination under polarised light has indicated some attenuation of the spherulite structure in the direction at right angles to the axis of the depression; there is also some birefringence, signifying some orientation in the same direction. It is believed that the pre-orientation effect is the most important effect. However, there is an indent effect, i.e. predetermining the place where orientaion should begin. In addition, the accurate formation of depressions can reduce the variations in thickness which would otherwise occur in the strand-forming zones due to variations in thickness in commercially available plastics material sheets.

The yield and draw curves are altered, being made much more regular with a lower yield point (yield load); the yield loads can be greatly reduced, particularly for PP. This reduction can be as high as 30%. There is however very little effect on the tensile strength of the final product, it is believed because no plastics material is actually removed and forming the depression has an effect similar to that which occurs on stretching. The cross-sectional size of the strand in the final product is not substantially altered.

The invention enables stretching machine power to be reduced because the yield loads are smaller. In addition, as the stretching is more regular and very high strain rates can be eliminated, through-put or overall speed of production can be greater. Thus with PP it has been found possible to stretch at a rate of 2000%/minute, and stenter through-put speeds of 9 meters/minute have been achieved, expected speeds being as high as 20 meters/minute or more.

A greater degree of control of mesh sizes or strand lengths can be effected with PP since the draw load exceeds the yield load at much lower orientation ratios; if it were desired to have a mesh of a smaller size, the range of orientation ratio capable of producing regular structures would allow this to be achieved.

The advantages of forming the depressions to produce improved structures during TD stretching can also be extended to forming the depressions to produce more regular MD stretched material with similar reductions in yield loads and subsequently lower machine power requirements.

All or most plastics materials have no precise melting point; they have a melting range and a softening range, the ranges not being very precisely definable and overlapping. For instance, the softening and melting ranges may be about 118°–128° C. and 122°–138° C. for HDPE and 150°–160° C. and 160°–168° C. for PP. It is believed that in theory, the depressions could be formed at a temperature close to, e.g. within about 10° C. or 15° C. of, the lower limit of the melting range. At higher temperatures, material would merely be displaced, in effect reducing the cross-sectional area of, and weakening, the eventual strand. It is more convenient to form the depressions at lower temperatures. In practice, this means that the preferred temperature is at or substantially below the orientation (stretching) temperature (normally about 100° C. for HDPE and 110°–130° C. for PP) or at or close to the ambient temperature, say 15° or 20° C. There is however a danger that some plastics materials, particularly PP, may shatter if depressions are formed rapidly at low temperature, giving a practical lower limit for mass production using e.g. PP; for instance, the depressions could be rolled into PP at 10° C., but it would be advisable to have a minimum temperature of 20° C. if the depressions are pressed in at high speed.

GB No. 1 261 151, FR No. 1 601 073 and GB No. 900 914 show the formation of depressions or necks, but they are formed in the molten plastics material and the effect of the present invention is not achieved.

It is preferred that the deepest part of the depressions are substantially at the narrowest parts of the strand-forming zones, but this is not essential and great precision is not usually practicable or necessary—for instance there may be a plurality of depressions in a strand-forming zone, spaced in the direction of stretch. As long as the depressions are not in too wide a part of the strand-forming zone, the strand-forming zone will begin to orientate at the depression(s), which is satisfactory.

A wide variety of shapes of depressions can be used, even depressions which do not extend right across the strand-forming zones and are for instance conical. However, the preferred depressions are wedge-shaped, e.g. with the apex of the wedge extending substantially at right angles to the stretching direction; slight radiussing would be applied to the base of the wedge-shaped depression, to stop the tool cutting the plastics material. Alternatively, rounded-section depressions could be used, e.g. a part-circular cylindrical depression with the axis extending substantially at right angles to the stretching direction. In general, with a tool whose cross-section taken parallel to the stretching direction is substantially constant across the width of the tool (direction at right angles to the stretching direction) and presenting opposite, inclined faces in the stretching direction, there is very little movement of the plastics material at right angles to the stretching direction and the orientation caused is most intense at the bottom of the depression. It is preferred that the depressions should extend for the whole length of the holes on either side of the strand-forming zones, though in practice the depressions may be smaller or shorter; the advantage of equating the extent of the depression to the width of the adjacent hole is that on stretching orientation progresses smoothly from the centre of the strand to the junction region. It is possible however to have the depressions bounded by steps substantially at right angles to the faces of the plastics material, the steps also extending at right angles to the stretching direction; this would tend to prevent orientation proceeding beyond the depressions.

The stretching behaviour can be altered by altering the depth of the depressions. It is believed that the depth, rather than the length, of the depression, has the greatest effect.

In practice, the depressions would be formed on the faces of the plastic material. However, at least in theory, it would be possible to form the depressions on the side edges of the strand-forming zones.

The axis of the depression, e.g. the direction in which the base of the wedge extends, is preferably at right angles to the direction in which the strand-forming zone is stretched, or more generally at right angles to the direction of stretch of the starting material as a whole. Thus with a diamond structure such as that of GB No. 2 034 240A, the axes of the depressions can be at right angles to the direction of stretching the starting material as a whole even though the strand-forming zones extend at an angle to said direction of stretch. Depending on the product to be formed, the axes of the depressions can extend in the TD and/or in the MD.

It is preferred to form the depressions before any stretching, but the strand-forming zones of a second stretch could be formed with depressions after the first stretch.

Some problems would arise because forming the depressions causes a slight increase in MD or TD dimension, possibly 0.5% overall. However, the depressions can be formed by rolling them in, whether in the MD or TD, before or after punching in the case of punched starting materials; pairs of rolls can be used, with the form (corresponding to the depressions) extending around the whole periphery of one or both rolls—this is most suitable for forming MD depressions, and if TD depressions are rolled in, depressions can be formed on the selvedges by nipping them with registering (out of mesh) cogs.

Alternatively, the depressions can be formed by straight pressing. The preferred procedure when forming holes in the plastics material by punching, is to press in the depressions during the same press cycle, e.g. as the press ram approaches bottom dead centre; the depressions are thus formed whilst the ram is travelling at its slowest speed, reducing the possibility of the plastics material being damaged by high impact loads. This can be done for TD and/or MD depressions. The depressions will be formed in a part of the starting material adjacent to the punched hole.

If there are selvedges, it is useful to form the TD depressions on the selvedges in addition to the body of the material as this helps the selvedges behave in the same way as the remainder of the sheet and not distort the sheet. The selvedge would no longer be a wide strip of oriented material of constant thickness but would have an undulating thickness profile with high orientation in the depressed area and a much lower orientation in line with e.g. TD bars. The effect of such a selvedge can be three fold. Firstly—by treating the selvedge in the same way as the body of the structure the tendency to bow forward in the centre of the web during MD stretching will be greatly reduced. Secondly—the selvedge would have the raised sections directly in line with e.g. the TD bar which is to be oriented; therefore on a stenter, the stenter clip would be gripping to maximum effect in the most advantageous position. Lastly—since the raised portions of the selvedge would have much less orientation, the tendency for the selvedge to split or crack would be much less.

PREFERRED EMBODIMENTS

The invention will be further described, by way of example, with reference to the accompanying drawings, in which:

FIG. 1b is an isometric view of the starting material of FIG. 1a;

FIG. 1c is a section along the line IA—IA of FIG. 1a;

In the respective Figures, the lines ("profile shading") which indicate the profile of the structure extend up and down the slope, following the line of maximum gradient, i.e. at right angles to conventional contour lines.

FIGS. 1a to 1e

Figure 1A:
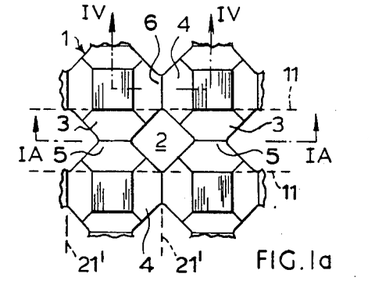
FIG. 1a is a plan view of a starting material in accordance with the invention.
Figure 1B:
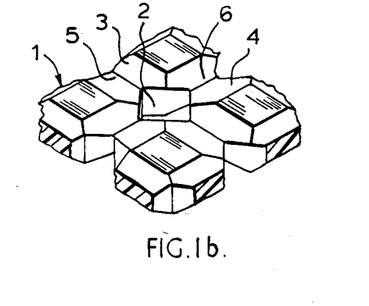
Figure 1C:
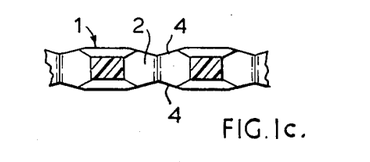

The uniplanar starting material 1 of FIG. 1a has a pattern of holes 2 whose centres lie on a notional, substantially square or rectangular grid. As shown in FIG. 1a, depressions 3, 4 are formed by pressure (no material removal) in the strand-forming zones 5,6 which are to be stretched. The way of stretching the starting material 1 is known and is also explained in GB No. 2 035 191B. During orientation, the plastics material is maintained approximately at a uniform temperature, a water bath being effective for this purpose as it removes adiabatic heat generated during stretching. In the first stretch, a uniplanar, uniaxially stretched structure 7 (FIG. 1d) is formed. The stretching force is applied at the same time to a plurality of first strand-forming zones 5 in series; orientation begins at the indents of the strand-forming zones 5 and the zones 5 are stretched out into orientated strands 8 which are interconnected by substantially parallel bars 9. Each bar 9 comprises a succession of alternate notional zones, namely zones 10 between and interconnecting the ends of aligned strands 8 and the second strand-forming zones 6 between the zones 10. As indicated by the profile shading in FIG. 1d, the orientation of the strands 8 proceeds at least as fas as the notional tangent line 11 indicated in FIGS. 1a and 1d.

Figure 1D:
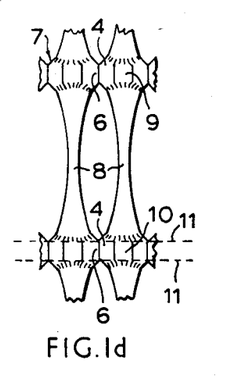
FIG. 1d is a plan view of the mesh structure formed by stretching the starting material of FIG. 1a uniaxially (the scale is about half that of FIGS. 1a to 1c)
Figure 1E:
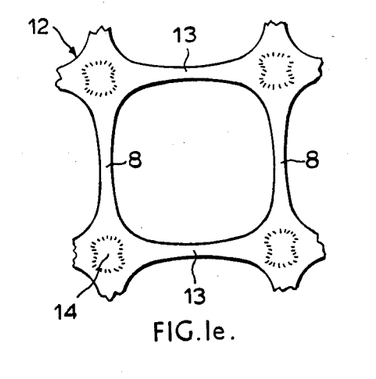
FIG. 1e is a plan view of the mesh structure formed by stretching the mesh structure of FIG. 1d along a second axis at right angles.

In the second stretch, the structure 7 of FIG. 1d is stretched in a second direction at right angles to form a uniplanar, biaxially-stretched structure 12 (FIG. 1e). The stretching force is applied to a plurality of the second strand-forming zones 6 in series; orientation begins at the indents of the second zones 6 and the second zones 6 are stretched out into orientated strands 13. The structure 12 is in the form of a generally rectangular grid of orientated strands 8, 13 and orientated junctions 14 therebetween, the profiles of the junctions 14 being indicated by the profile shading.

It will be seen that the holes 2 are radiussed squares with their diagonals parallel to the stretching directions, defining wedge-shaped indents in the side edges of the strand-forming zones 5,6; this provides a pronounced indent effect in addition to that of the depressions. An advantage of these holes 2 is that on the first stretch the stress applied to the strands 8 is dispersed and not directed narrowly straight across the bar 9; this causes the distance of penetration of orientation into the bar 9, or the amount of penetration across the bar 9, to be controlled, and in turn causes the penetration to be more regular across the mesh structure 7.

Figures 2A, 2B, 2C:
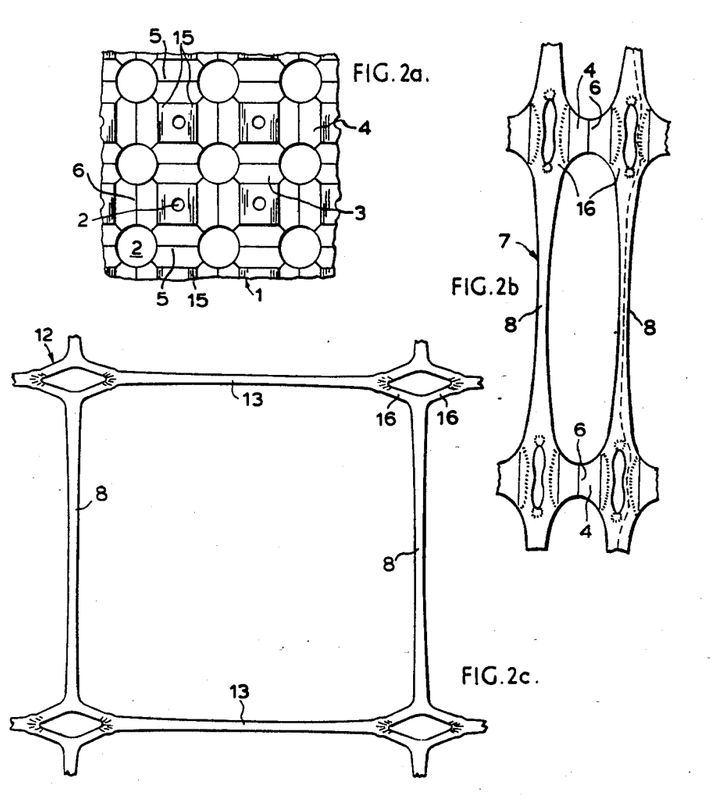
FIGS. 2a to 2c correspond to FIGS. 1a, 1d and 1e but show a different starting material and mesh structures.

FIGS. 2a to 2c

These Figures correspond to FIGS. 1a, 1d and 1e above, modified in accordance with the method of GB No. 2 096 531A, and need not be described in detail. FIGS. 2a to 2c illustrate that it is not necessary to form the depressions in all strand-forming zones (though normally all corresponding strand-forming zones would be formed with like depressions). No depressions are specifically formed in the zones 15 that form the short strands or legs 16 though there is some tapering of an edge. The width of the main strand-forming zones 3 is chosen in relation to the width of the zones 15 such that the zones 3 orientate first, when it is found that the zones 15 orientate reasonably regularly.

Figures 3A, 3B:
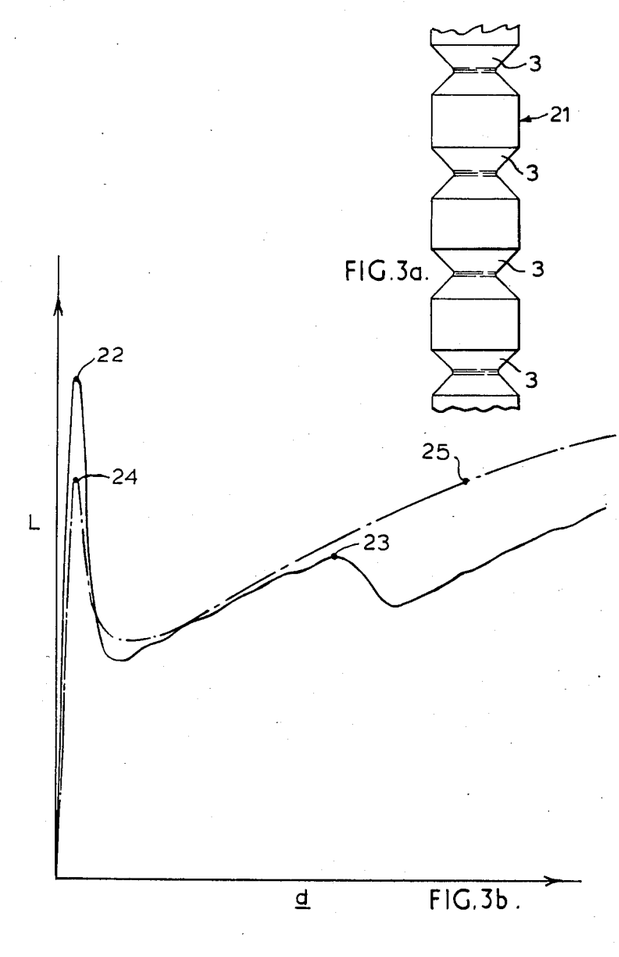
FIG. 3a is a plan view of a test strip.
FIG. 3b is a load/extension graph.
Figure 3C:
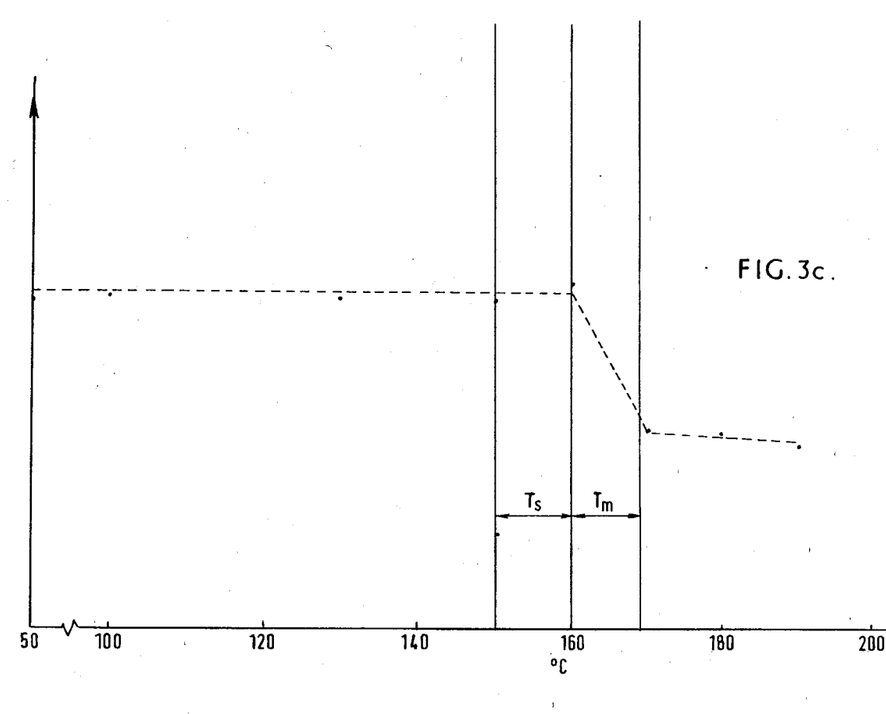
FIG. 3c is a graph of peak load against depression temperature.

FIGS. 3a, 3b and 3c

Test strips 21 were cold profiled at the sides (with material removal) and correspond to a strip down the starting material 1 of FIG. 1a between the dashed lines 21' without the depressions 14. The test strips 21 had a maximum width of 16 mm, the remainder of the details being as for FIG. 4c below (see Table 2 below), as appropriate. Orientation tests were carried out at 110° C. with test strips with planar faces, and with test strips formed at 110° C. with the depressions 3, measuring the load (L) against extension (d). The graph of FIG. 3b was drawn.

Even with the test strip 21 without the depressions 3 (full line in FIG. 3b), some physical change occurs in the strand-forming zones when the load is applied. However, one of the strand-forming zones yields first (point 22 in the graph), orientation occurs and the load decreases. The load then increases in rounded steps to a new maximum 23 (late start to orientation in one or more strand-forming zones), decreases as the further zone(s) begin to orientate, and so on.

When the depressions 3 are present (dash-dot line in FIG. 3b), the strand-forming zones all begin to orientate at the same time (point 24, about 20% lower than point 22), and there are no further maxima, a smooth curve being followed. The draw load exceeds the yield load at point 25.

With HDPE, there was little reduction of the yield load (therefore little reduction in power requirements)

but the draw curve was smoother, indicating a regular stretching of the meshes in series.

Using the same test pieces 21, depressions were then formed at various temperatures. Orientation was again carried out at 110° C. The tensile tests were then carried out at ambient temperature (20° C.). Details of the tests are set out in Table 1 below, and FIG. 3c is a graph of the peak load on the product against the temperature at which the depressions were formed. The vertical lines indicate the softening range ($T_s$) and the melting rang ($T_m$). Below 170° C., the test pieces were heated up in an oven to the temperature specified; however, from 170° C., the depressions 3 had to be formed using a hot grooving tool to heat the plastics material rather than using a hot test piece. In spite of the difference in procedure, there is a clear indication of a change in behaviour over the melting range. This is believed to be the result of flowing material in a molten state away from the centre of the depression, at temperatures of 170° C. and above, as opposed to carrying out a small amount of molecular orientation at temperatures of 160° C. and below.

TABLE 1

| Depressions formed at °C. | Orientation Yield Load | Product Peak Load | Strand Tensile Strength N/mm² |
|---|---|---|---|
| 50 | 124.0 | 157.5 | 447 |
| 100 | 125.5 | 158.2 | 470 |
| 125 | 125.0 | 157.5 | 462 |
| 150 | 133.0 | 157.0 | 452 |
| 160 | 120.0 | 162.0 | 453 |
| 170 | 138.0 | 123.0 | 403 |
| 180 | 135.0 | 122.0 | 394 |
| 190 | 130.5 | 119.0 | 395 |

FIGS. 4a to 4e

Figures 4A, 4B, 4C, 4D, 4E, 5:
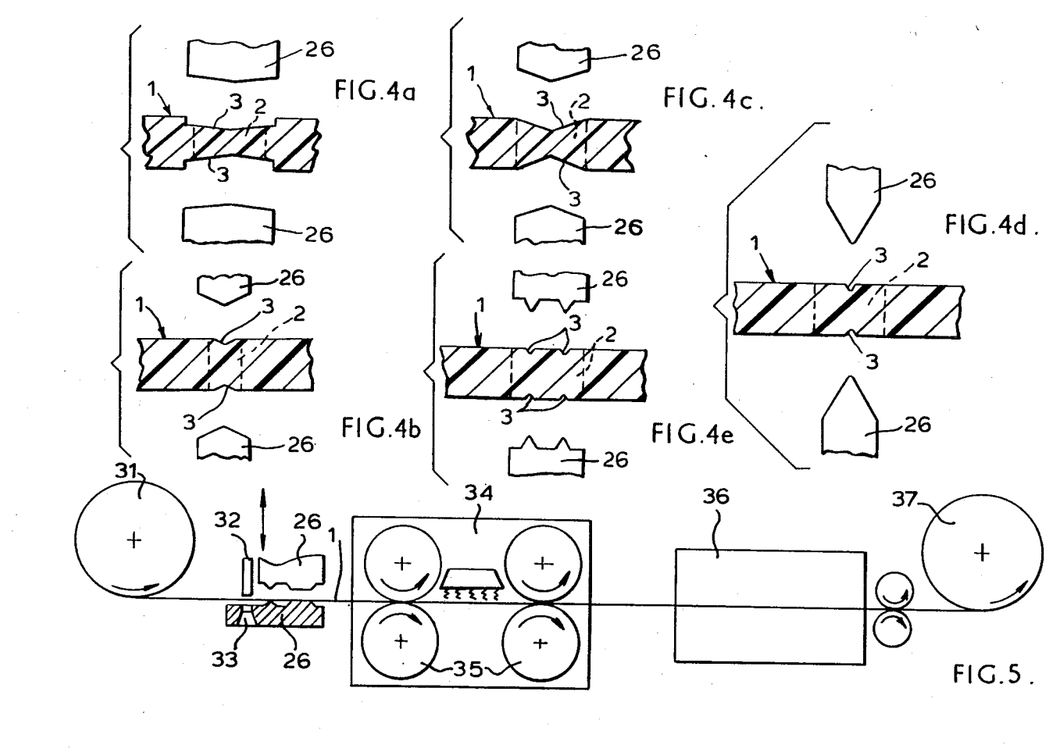
FIGS. 4a to 4e show depression shapes, as seen in section along the line IV—IV in FIG. 1a, on a larger scale.
FIG. 5 is a schematic side view of plant for carrying out the invention.

Table 2 below gives details of various examples of the depressions 3 of FIGS. 4a to 4e. Registering depressions 3 of the same depth were formed on opposite faces of 4.5 mm thick PP; the ends of the holes 2 are indicated with dashed lines. The base of each depression 3 is approximately coincident with the centre lines of the holes 2, except for FIG. 4e. For different thickness materials, the depressions 3 can be altered proportionally. The tools 26 are indicated; FIG. 4b shows that the same tool could be used to make depressions of differing lengths and depths.

TABLE 2

(measurements in millimeters)

| Form | Length of each | Depth of each | Ratio of combined depth to material thickness | Inclination of base facets | Height of step | Pitch of twin | Length of hole |
|---|---|---|---|---|---|---|---|
| FIG. 4a | 10 | 0.6 | 26% | 3° | 0.34 | — | 8 |
| FIG. 4b | 1.6 | 0.4 | 18% | 26° | — | — | 4 |
| FIG. 4b | 1.0 | 0.45 | 20% | 26° | — | — | 4 |
| FIG. 4b | 2 | 0.5 | 22% | 26° | — | — | 4 |
| FIG. 4b | 2.2 | 0.55 | 24% | 26% | — | — | 4 |
| FIG. 4c | 8 | 0.55 | 24% | 12° | — | — | 8 |
| FIG. 4d | 0.52 | 0.45 | 20% | 60° | — | — | 8 |
| FIG. 4e | 0.35 | 0.3 | 13% | 60° | — | 4 | 8 |

It will be seen that the depressions 3 can be longer than the holes 2 (FIG. 4a), shorter than the holes 2 (FIG. 4b) or the same length as the holes 2 (FIG. 4c). FIGS. 4d and 4e show that the sides of the depression 3 can be steeper to reduce the force required, and preferred angles are in the range of about 50° to 70°, the end of the tool 26 being radiussed to avoid a cutting edge; it is found that the product is substantially the same. FIG. 4e shows that more than one depression 3 can be formed in a strand-forming zone 5; if desired, the remote edges of the twin depressions could be aligned with the ends of the hole 2. In one direction, orientation will run along the strand-forming zone 5 until it meets the orientation from the other depression 3—in the other direction, orientation will pass into or be impeded by the bar 9 or junction 14 in the normal manner.

Expressed as a percentage of the thickness of the undepressed zones of the plastics material, the depth of a depression 3 on one face only (i.e. with no registering depression) or the combined depths of registering depressions 3 on opposite faces, is preferably less than about 40%, more preferably less than about 25%; the percentage is preferably more than about 10%, possibly more than about 20%.

Though only the depressions 3 are illustrated in FIGS. 4a to 4e, the depressions 4 could be shaped likewise.

FIG. 5

FIG. 5 shows plant for the biaxial stretching of punched plastics material sheet, generally as in GB No. 2 035 191B. The sheet is unwound from a reel 31 and passed between a line of reciprocating punches 32 and dies 33. The punch beam and the die beam carry tools 26 for forming depressions 3 as in FIG. 1a, adjacent the bottom dead centre of the movement of the punch beam. The starting material 1 is then heated in an enclosure 34, stretched MD by differential rolls 35, stretched TD on a stenter in a heated enclosure 36, cooled, and wound on a reel 37. In each direction, the stretching force was applied to a plurality of the strand-forming zones 5,6 at the same time. If desired, the MD stretched material could be cooled and wound on a reel directly after MD stretching, and later unwound for TD stretching.

I claim:

1. A method of producing a plastics material mesh structure, comprising:
   providing a plastics material comprising a pattern of holes or mesh openings defining strand-forming zones therebetween, which plastics material mesh structure has a melting range having a lower limit, and forming depressions in at least some of said strand-forming zones without material removal when said plastics material is at a temperature below said lower limit; and
   stretching said strand-forming zones to form orientated strands.

2. The method of claim 1, wherein said plastics material defines a plurality of strand-forming zones in series in the direction of said stretching, said depressions are formed in each said strand-forming zone in series, and said plastics material is stretched by applying a stretching force to a plurality of said strand-forming zones in series simultaneously.

3. The method of claim 1, wherein said temperature is at or close to ambient temperature.

4. The method of claim 1, wherein said depressions are formed with a tool whose cross-section taken parallel to the direction of said stretching is substantially constant across the width of said tool, said tool presenting opposite, inclined faces.

5. The method of claim 1, wherein said depressions are wedge-shaped, having an apex which extends substantially at right angles to the direction in which the respective said strand-forming zones are stretched.

6. The method of claim 1, wherein said strand-forming zones are defined between two respective said holes or mesh openings, said depressions being formed so as to extend for substantially the whole length of said holes or mesh openings but not substantially further.

7. The method of claim 1, wherein said strand-forming zones are between respective said holes or mesh openings, said depressions extending for substantially less than the length of said holes or mesh openings.

8. The method of claim 1, wherein said depressions are bounded by steps which extend substantially at right angles to the faces of said plastics material, said steps extending substantially at right angles to the direction in which the respective said strand-forming zones are stretched.

9. The method of claim 1, wherein a plurality of said depressions, spaced apart in the direction of said stretching the respective said strand-forming zone, are formed in a said strand-forming zone.

10. The method of claim 1, wherein said plastics material is biaxially-stretched in a continuously-operating plant by being stretched in the machine direction and in the transverse direction, said depressions being formed in at least said strand-forming zones which are stretched in the direction of said transverse stretching.

11. The method of claim 1, wherein said holes are formed in said plastics material by punching, said depressions being formed generally at the same time as the punching in an adjacent part of said plastics material.

12. The method of claim 1, wherein in any said strand-forming zone, there is a said depression on one face only of said plastics material, the depth of said depression being less than about 40% of the thickness of the undepressed zones of said plastics material.

13. The method of claim 12, wherein said depth is less than about 25% of said thickness.

14. The method of claim 1, wherein in any said strand-forming zone, there is a said depression on one face only of said plastics material, the depth of said depression being more than about 10% of the thickness of the undepressed zones of said plastics material.

15. The method of claim 1, wherein there are registering said depressions on opposite faces of said plastics material, the combined depth of said registering depressions being less than about 40% of the thickness of the undepressed zones of said plastics material.

16. The method of claim 15, wherein said combined depth is less than about 25% of the thickness of the undepressed zones of said plastics material.

17. The method of claim 1, wherein there are registering said depressions on opposite faces of said plastics material, the combined depth of said registering depressions being more than about 10% of the thickness of the undepressed zones of said plastics material.

18. The method of claim 1, wherein there are registering said depressions on opposite faces of said plastics materials, said registering depressions being of substantially the same depth.

19. A method of biaxially stretching plastics material to produce a mesh structure, comprising:
providing a plastics material comprising a pattern of holes centered on a notional square or rectangular grid whose sides extend in a first direction and in a second direction at right angles to said first direction, transverse strand-forming zones being defined between holes in rows extending in said first direction and longitudinal strand-forming zones being defined between holes in rows extending in said second direction, said plastics material having a melting point range with a lower limit;
forming depressions in at least said transverse strand-forming zones without material removal when said plastics material is at a temperature below said lower limit;
stretching said plastics material longitudinally in said first direction to stretch said longitudinal strand-forming zones into orientated longitudinal strands; and
stretching said plastics material transversely in said second direction to stretch said transverse strand-forming zones into orientated transverse strands.

20. The method of claim 3 wherein said temperature is about 15°-20° C.

21. The method of claim 1, wherein the respective depressions extend right across the strand-forming zones, as considered in the direction at right angles to the direction in which the respective strand-forming zones are stretched.

22. The method of claim 1, wherein the depressions are formed by a low speed punch.

* * * * *